United States Patent [19]

Bartlett, Jr.

[11] 4,235,723

[45] Nov. 25, 1980

[54] REVERSE OSMOSIS MEMBRANE MODULE

[75] Inventor: James L. Bartlett, Jr., Santa Barbara, Calif.

[73] Assignee: Hydranautics, Goleta, Calif.

[21] Appl. No.: 39,209

[22] Filed: May 15, 1979

[51] Int. Cl.³ .............................................. B01D 31/00
[52] U.S. Cl. ............................ 210/321 R; 210/433 M; 210/497.1
[58] Field of Search ........... 210/321 R, 321 A, 321 B, 210/497.1, 433 M; 422/48; 55/158

[56] References Cited

U.S. PATENT DOCUMENTS

| | | | |
|---|---|---|---|
| 3,367,504 | 2/1968 | Westmoreland | 210/321 R |
| 3,386,583 | 6/1968 | Merten | 210/321 R |
| 3,397,790 | 8/1968 | Newby et al. | 210/321 R |
| 3,417,870 | 12/1968 | Bray | 210/321 R |
| 3,510,004 | 5/1970 | Hoectzenbein | 210/321 B |
| 3,872,014 | 3/1975 | Schell | 210/232 |

OTHER PUBLICATIONS

"Reverse Osmosis, Ultrafiltration and Eastman Membrane", Eastman Kodak Co. 1971.

*Primary Examiner*—Charles N. Hart
*Assistant Examiner*—David R. Sadowski
*Attorney, Agent, or Firm*—Richard H. Zaitlen

[57] ABSTRACT

This invention relates to a reverse osmosis membrane module for separating a selected fluid component from a feed stock. The module comprises a mandrel having an axial passageway forming a flow path for the selected fluid component through the mandrel. A flow guide means is attached to the mandrel and forms a channel for the selected fluid component as it flows through the membrane module. A plurality of generally rectangular membrane envelopes are joined to the flow guide mandrel and are formed from a plurality of elongated permeate collector sheets each forming a flow path for the selected fluid component from the outer periphery of the envelope to the flow guide. A plurality of folded sheets of support material with each sheet having predetermined membrane areas where reverse osmosis occurs are joined to the collector sheets so as to form the membrane envelope. Each sheet of support material is formed such that there are no fold lines on the membrane areas where reverse osmosis occurs. Finally, a flow guide spacer is disposed between adjacent envelopes such that one end of each of the flow guide spacers is located in the area where the support sheet is folded and where no reverse osmosis takes place.

7 Claims, 6 Drawing Figures

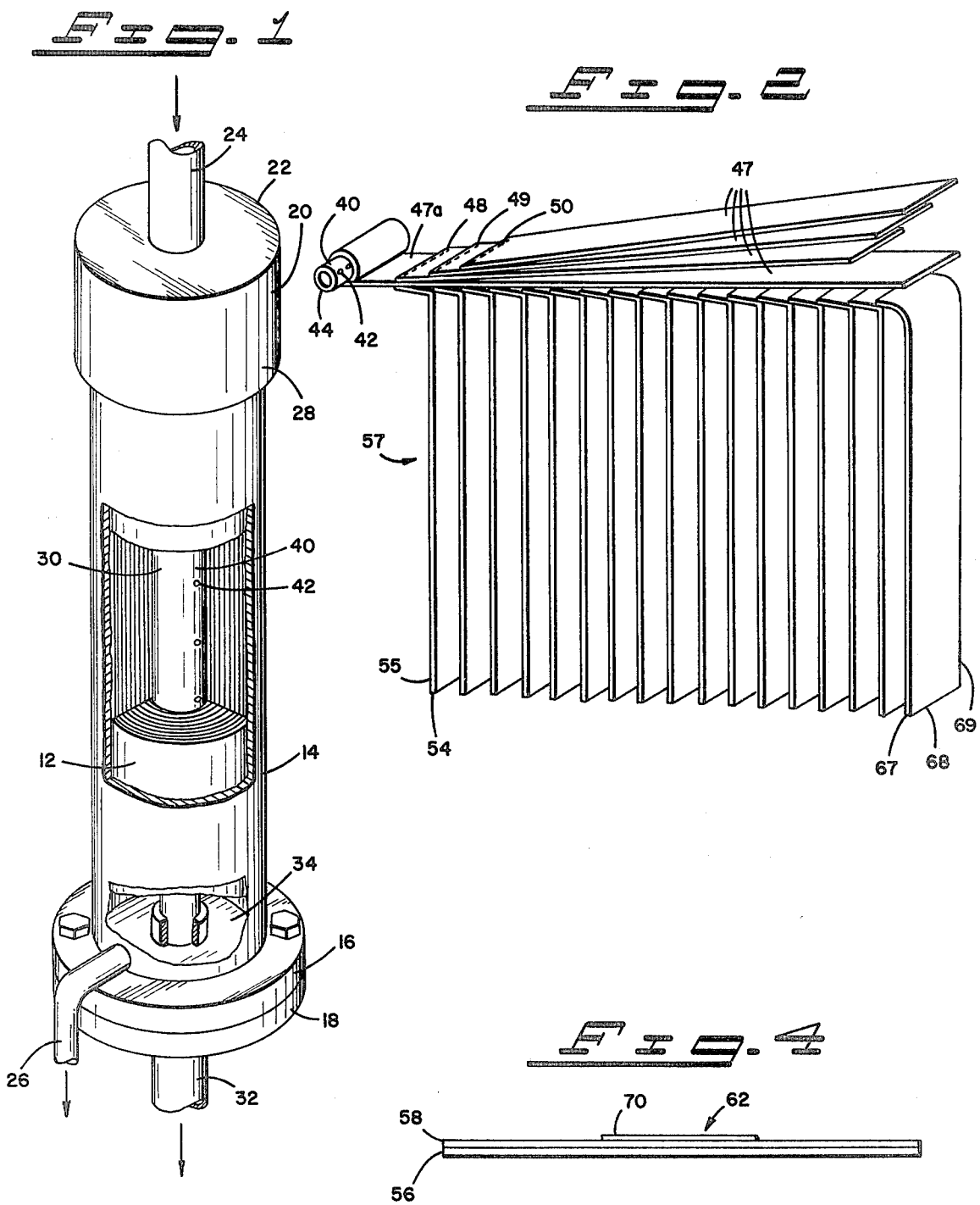

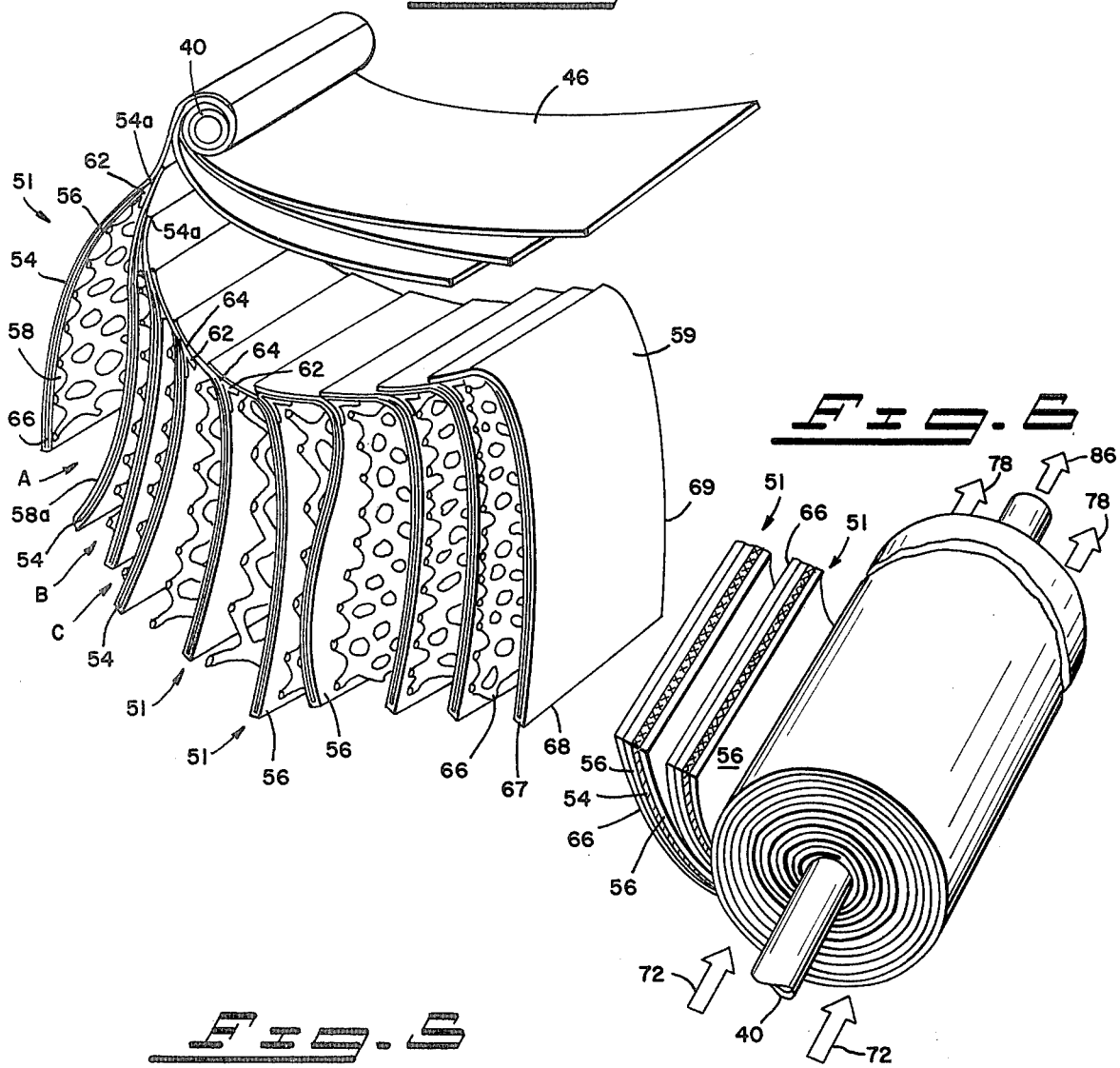

REVERSE OSMOSIS MEMBRANE MODULE

BACKGROUND OF THE INVENTION

1. Field of the Invention

The present invention relates to the field of reverse osmosis purification apparatus, and more specifically, to an improved reverse osmosis membrane module.

2. Prior Art

The use of reverse osmosis purification apparatus for desalinating water is well known in the art. One type of prior art process involves evaporation of, for example, brackish water or sea water in order to remove the undesirable components therefrom. The problem with such a process is that it requires a relatively high input of energy and in addition problems due to phase change of the liquid, high temperature corrosion and scaling are also present. These factors result in a high cost of the purified water so produced. Solar distillation apparatus are also used in the art and have generally proven to be of limited feasibility in most instances due to the relatively large structures required and their associated expense.

Yet another type of prior art process involves the use of a specifically configured membrane module in which a plurality of membrane sandwiches are formed such that each sandwich touches a central mandrel. This configuration is more fully set forth in U.S. Pat. No. 3,417,870. In that patent, the module is disclosed which comprises a plurality of membrane sandwiches made of coextensive leaves of sheet-like backing material which extend radially outward from a central hollow mandrel. Each leaf is associated with a sheet of semipermeable membrane such that both are wrapped around the mandrel. Care is taken in the formation of the sandwiches such that each sheet of backing material is in contact with and extends radially outward from the central mandrel. The problem with such a configuration is that only a limited number of membrane sandwiches can be formed around the central mandrel. Thus, while such configuration may be useful for a small element, if large quantities of water have to be processed, it has been found that such configuration is not sufficiently efficient. In addition, the semipermeable membrane material is folded back upon itself such that a folded edge is created along the length of contact with the mandrel. It has been found that when such a sheet of membrane is folded, there is the possibility that the fold line will substantially weaken the membrane material enabling undesirable components of the fluid to be purified to flow across the membrane. Should such a weakening and eventual flow of the fluid across the membrane be permitted, the entire membrane module would have to be removed and either repaired or replaced.

Other prior art teachings are found in U.S. Pat. Nos. 3,397,790; 3,367,504; and 3,386,583. These devices likewise contain a number of significant shortcomings which have limited their applicability in practice.

The present invention provides a spirally wrapped reverse osmosis membrane module for separating a selected fluid component from a feed stock and which substantially overcomes all of the problems associated with the prior art modules as discussed hereinabove. In addition, the membrane module of the present invention permits a relatively straight forward manner of construction to be used substantially reducing the cost and increasing the service life of each module.

BRIEF SUMMARY OF THE INVENTION

The present invention generally relates to an apparatus adapted for economically recovering purified water from brackish water or sea water in commercial quantities. The apparatus employed in accordance with the principals of the present invention applies a recognized phenomenon commonly designated as "reverse osmosis". The process of reverse osmosis is generally defined as the diffusion proceeding through a semipermeable membrane, typically separating two unequally concentrated solutions, which tends to equalize the concentration of the solutes in each solution. Generally, an ideal semipermeable membrane is one having a finite permeability for a predetermined component of a solution, for example, water, while remaining totally impermeable to another component in the solution, for example, sodium chloride and the like. During the process of osmosis, pure water typically diffuses from a first solution having a lower solute concentration through the semipermeable membrane into a second solution having a higher solute concentration.

It has been found that the application of an elevated pressure relative to the pressure applied to the first solution restrains diffusion of the pure water through the membrane into the second solution. The osmotic pressure is that pressure at which diffusion into the second solution through an ideal semipermeable membrane is substantially arrested. When the pressure applied to the second solution is further increased relative to that applied to the first solution, such that the osmotic pressure of the second solution is exceeded, reverse osmosis occurs. By virtue of this phenomenon, pure water diffuses through the membrane into the first solution.

The particular pressure at which reverse osmosis occurs is generally dependent upon the composition of the particular solutions disposed on the opposite sides of the semipermeable membrane. For example, if ordinary sea water is disposed on one side of a suitable semipermeable membrane and a relatively pure water solution is present on the other side, reverse osmosis begins to occur when the sea water is subjected to a pressure of approximately 350 pounds per square inch absolute. As a result, pure water diffuses through the membrane from the sea water. If the total membrane surface area is relatively large, and an appropriate means is provided for collecting the purified water, substantial quantities of sea water or other such solutions may be purified on a relatively large scale.

In the device of the present invention, a spirally wrapped reverse osmosis membrane module is used in such a process. The module is configured and has specific applicability for separating a selected fluid component, for example, purified water, from a feed stock, for example, brackish water or sea water. The mandrel is configured so as to have an axial passageway forming a flow path for the selected fluid components through the mandrel. Joined to the mandrel is a flow guide member which forms a channel for the selected fluid component as it flows through the module to the mandrel. The flow guide member is spirally wrapped around the mandrel and is in fluid communication with the axial passageway. A plurality of generally rectangular membrane envelopes are also spirally wrapped around the mandrel such that the distance from each envelope to the mandrel radially increases along the generally spiral path. Each envelope is formed from (i) an elongated permeate collector sheet which in turn forms a flow path for the selected fluid component from the outer periphery of the envelope to the flow guide member, and (ii) a support sheet with each sheet having membrane areas formed thereon attached to each side of the collector sheet. Each support sheet is folded and positioned between two adjacent collector sheets and is joined to three sides of each collector sheet so as to form the membrane envelope. The membrane areas on each support sheet are the areas where reverse osmosis with the feed stock takes place such that only the selected component is permitted to flow across the support material to the elongated permeate collector sheets. Further, the support sheet is folded such that there are no fold lines on the membrane areas. In this manner problems associated with folded membranes and the like are substantially overcome. Finally, a flow guide spacer is disposed between adjacent envelopes such that one end of the flow spacer is located adjacent the area where the support sheet is folded and where no reverse osmosis takes place. The flow guide spacers are arranged and configured so as to separate each envelope thereby forming a passageway for the feed stock to flow across the membrane areas on each of the envelopes.

The novel features which are believed to be characteristic of the invention both as to its organization and method of operation, together with further objectives and advantages thereof will be better understood from the following description considered in connection with the accompanying drawings in which a presently preferred embodiment of the invention is illustrated by way of example. It is to be expressly understood, however, that the drawings are for the purpose of illustration and description only, and are not intended as a definition of the limits of the invention.

BRIEF DESCRIPTION OF THE DRAWINGS

FIG. 1 is a partially broken away perspective view showing a purification unit constructed in accordance with the principles of the present invention;

FIG. 2 is a perspective view showing the various elements disposed around the mandrel prior to wrapping;

FIG. 3 is an enlarged perspective view showing the various components of each membrane envelope;

FIG. 4 shows an enlarged view of the backing material which contains the semipermeable membrane areas;

FIG. 5 is an enlarged perspective view showing how the feed stock flows across each membrane envelope so as to permit a selected component to flow through the membrane areas; and FIG. 6 is a perspective view showing the spiral wrapping of the various membrane envelopes as well as the spiral flow guide member.

DETAILED DESCRIPTION OF THE INVENTION

Referring first to FIG. 1, one can see a water purification unit 10 which contains the improved membrane module 12 of the present invention. In one embodiment, the water purification unit 10 includes a pressure tight cylinder 14 which forms a housing for the module 12. More specifically, the water purification unit 10 includes a flange 16 forming a water tight seal at a first end 18, and a cap 20 also forming a water tight seal on the cylinder 14 adjacent the second end 22. Various means including bolts, adhesives, seals and the like can be used to join flange 16 and cap 20 to the cylinder 14 in a water-tight and air-tight manner. A feed inlet pipe 24 extends through the cap 20 and supplies the feed water to second end 22 of the module 12 as hereinbelow described in greater detail. An outlet pipe 26 is disposed through the cylinder 14 adjacent the flanged end 18 thereof, and permits the feed which has not crossed into the various membrane envelopes to exit out of the water unit 10. Generally, the water unit 10 is configured so as to form a water feed-in area 28 located adjacent second end 22 of the module 12 and a purification area 30 which is located within the module 12. As feed stock flows along the length of the module 12, it is caused to separate such that a selected fluid component travels across and through specifically configured membrane envelopes in a spiral path to the center of the module 12. From here, the selected component would flow out of the unit 10 through the product water outlet pipe 32. In the preferred embodiment, product water outlet pipe 32 is joined to the module 12 by means of a sleeve or connector 34. Of course, it is understood that other means for joining the product water outlet pipe 32 to the module 12 are within the scope of the present invention.

Referring now to FIGS. 1, 2 and 3 a more detailed explanation of the membrane module 14 is illustrated. Generally, membrane module 12 is comprised of a central mandrel 40 which serves as the flow path out of the water unit 10 for the selected fluid component which has been separated from the feed stock. As one can see more clearly in FIG. 2, the mandrel 40 has a plurality of openings 42 along the length thereof which are disposed through the wall of the mandrel 40 and are in communication with axial passageway 44. Wrapped around the mandrel 40 is a flow guide member 46. In the present embodiment, the flow guide member 46 is comprised of a plurality of sheets 47 of liquid permeate carrier material which are joined together at one end. Such sheets 47 of carrier material can be made of any material having sufficiently high porosity to permit a ready flow of water therethrough, while being subject to substantial pressure without collapse or undue creep. In addition, the material is preferably sufficiently flexible so that it may be spirally wound about the mandrel 40 without fracturing or deterioration. Among those materials which have been found to be useful include various plastic cloth screens such as, for example, nylon, polyester, rayon, acrylic and the like. The flow guide member 46 serves as a flow guide leading to the central mandrel 40 such that fluid flowing along member 46 is encouraged through openings 42 to the central passageway 44. In the preferred embodiment, the plurality of sheets 47 of permeate carrier material are joined together as shown in FIG. 2 along lines 48, 49 and 50 such as by sewing and the like. The reason why a plurality of sheets 47 are used is that this increases the cross-sectional area available for flow to the mandrel 40, i.e., each sheet 47 acts as a flow guide and fluid can travel along the length of each sheet 47. One can see that in the preferred construction, an initial sheet 47a is joined to the mandrel 40 and the remaining sheets are joined together in an overlapping configuration. After sheets 47 are joined together and sheet 47a is attached to mandrel 40, they are spirally wrapped such that spirally formed flow guide member 46 is created.

Referring now to FIGS. 2 and 3, one can see the various rectangularly shaped membrane envelopes 51 which form manifold assembly 52. Manifold assembly 52 is configured such that as the feed stock flows into the unit 10, it flows across each of the envelopes 51 along the width thereof. The selected fluid component is caused to travel into the envelopes 51 by reverse osmosis and toward the flow guide member 46. In many prior art membranes, each of the membrane envelopes, or their equivalent, was in direct contact with the central mandrel such the shortest distance of travel for the fluid could be achieved. While the present invention extends such distance of travel along a spiral path radially outward from the mandrel 40, the advantages achieved are that many more envelopes can be used. Modules of 4", 6", 12" and 18" diameter and even greater can thus be made. In order to enable this configuration to function properly, however, each envelope 51 is in contact with the spirally formed flow guide member 46 formed by the sheets 47 of permeate carrying material. Thus, when the module 12 is fully wrapped as shown in FIG. 6, each of the envelopes 51 forming the manifold 52 is in flow communication with member 46 in an ever increasing distance from the mandrel 40.

Each membrane envelope 51 is formed from a generally rectangular permeate collector sheet 54 with each sheet 54 being joined together as shown in FIGS. 2 and 3 at one end thereof adjacent the flow guide member 46. One can see that the fold line 54a created between adjacent sheets 54 is in flow communication with member 46 along the length thereof. In FIG. 2, the other elements of the membrane envelope 51 have been removed so as to show the initial configuration of the permeate collector sheets 54 in the overlapping configuration adjacent to member 46. In the presently preferred embodiment, permeate collector sheets 54 and permeate carrier sheets 47 can be made of the same material. The collector sheets 54 form a flow path for the selected fluid component within each envelope 51 such that the selected fluid component flows from the periphery of each of the envelopes 51 to the flow guide member 46 and then to the mandrel 40.

In the construction of each envelope 51, disposed between adjacent collector sheets 54 and inserted into the folded area 54a between each of the sheets 54, is a folded support sheet 56. Support sheets 56 are attached to each side of collector sheets 54 along edges 67, 68 and 69. In this matter, in order for water to enter an envelope 51, it must pass through a membrane area 58 formed on the sheets 56. Each sheet 56 is manufactured such that two distinct membrane areas 58 and 58a are formed thereon on each side of fold line 64. In this manner, no fold line is created on the membrane material per se where reverse osmosis with the feed stock takes place. This has been found to be especially desirable inasmuch as folding the semipermeable membrane substantially weakened the membrane. This can permit the feed stock, as it flows between each of the envelopes 51, to penetrate directly through the membrane into the path for the purified fluid. When this occurs, the entire module must be removed from the water unit and replaced. In the present invention, an area 62 is formed between each of the membrane areas 58 and along which fold line 64 is created. Area 62 is preferably thicker than areas 58 and is made such that reverse osmosis is substantially prevented. Area 62 is made of a material such that it can be readily folded without danger of puncturing or deteriorating due to high pressure. In this manner, problems associated with having a fold line formed on the support sheets 56 overcome.

Notwithstanding the problem created when the membrane and the associated support sheet was folded, the prior art also recognized the benefits of flow spacers to provide a uniform flow across each of the membrane areas where reverse osmosis takes place. In the present invention, this is achieved by the use of a plastic screen material 66. However, the edges of screen material 66 adjacent fold 64 also have been found to cause puncturing through the membrane areas 58. In the device of the present invention, however, area 62 is made such that puncturing by screen 66 is substantially prevented. Of course, it is recognized that by decreasing the area where reverse osmosis takes place, especially along fold line 64, the efficiency of any one envelope 51 may be reduced. However, the configuration of the present invention is such that additional envelopes 51 can easily be added so as to overcome any reduction in efficiency.

In fabrication of membrane modules of the prior art, a very large and complex "ferris wheel" type structure was used. A mandrel was located the center of a ferris wheel structure and each envelope or the equivalent was directly attached to the mandrel. As each envelope may be between two to ten feet prior to wrapping, the prior art structure had to extend out at lest that far. In the device of the present invention, such complicated structure and method of construction is substantially eliminated. In fabrication of membrane module 12 of the present invention, the sheets 47 of permeate carrier material are joined together, for example, by sewing or the like along lines 48, 49 and 50 thereby creating the flow guide member 46. The manifold assembly 52 is also formed prior to attachment to the mandrel 40. Preferably, the first of collector sheet 54, designated sheet 55, is joined to permeate carrier sheet 47a. Sheet 47a is joined to the mandrel 40 and the assembly as shown in FIG. 2 is placed on an elongated table. Folded support sheets 56 which contain the various areas 58 of semipermeable membrane are inserted between each of the permeate collector sheets 54 and joined thereto by gluing along edges 67, 68 and 69. In one method of construction, one folded sheet 56 is inserted at A, glued to edges 67, 68 and 69; one sheet 56 is inserted at B, glued; one at C, glued, etc. In this manner a fluid type seal is provided along the outer edges 67, 68 and 69 at the area of edge contact between the sheets 54 and sheets 56. This serves to seal the sheets 54 from communication with solutions which have not initially passed through the membrane areas 58. Note however, that fold line 64 on sheet 56 is not joined to folded edge 54a created between two adjacent carrier sheets 54. Thus, as fluid flows through each of the envelopes 51 it is readily permitted to flow into the flow guide member 46. Note also that the folded edge 64 formed in area 62 on each of the sheets 56 is inserted into folded area 54a. As discussed above, area 62, an area in which reverse osmosis does not take place, is made of non-permeable material which preferably is substantially thicker than membrane area 58. This has been found to substantially reduce the likelihood that leaks will occur between adjacent membrane envelopes 51 in area 62.

The semipermeable membrane areas 58 are generally in formed from a thin coating on the support sheets 56 such that areas 58 have a predetermined permeation rate. For efficient desalination operation, the membrane areas 58 are fabricated of a material exhibiting substantial salt rejection properties. Such materials are well known in the art and are formed from a celluous acetate membrane as disclosed in U.S. Pat. Nos. 3,133,132 and 3,133,137. It should be understood, however, that other materials are also within the scope of the present invention. For example, such membranes are preferably characterized by a thin, dense surface on one side of the sheets 56, which serves as a semi-barrier material, with the remainder of the sheets 56 being a porous support layer made of felt, polyester, and the like. In addition, composite polymer films can also be used to form the membrane areas 58. Finally, sheets of membrane without the use of a support material can be used so long as they are joined together and separated from one another by an area which is stronger and which does not permit reverse osmosis to take place.

Referring now to FIG. 4, one form of the porous support sheets 56 and membrane area 58 is shown. In this embodiment, the sheet 56 has had a layer of semipermeable membrane polymer formed thereon which forms the area 58 where reverse osmosis takes place. This polymer forms a relatively fragile coating on sheet 56. Note however, that an extra coating 70 has been applied over the sheet 56 and this is where the sheet 56 would be folded. As discussed above, while extra coating 70 especially in combination with layer 58 would not permit reverse osmosis to take place in area 62, the advantages are that penetration by the screen 66 or deterioration caused by forming a fold line 64 are substantially overcome. In addition to the formation of a distinct layer 70, other embodiments within the scope of the present invention include, for example, applying other material across the sheet 56 and then coating the sheet 56 with the membrane material. In such an embodiment, while membrane material would be folded, such fold would occur only in an area where no reverse osmosis takes place. Further, a thick coating of the membrane material could be formed in area 62 which in effect would also act as a barrier and protective area such that the fold line would be created in an area where no reverse osmosis takes place.

Referring now to FIGS. 5 and 6 one can see more fully how the device of the present invention operates. As the feed stock 72 flows along the length of the module 12, it is caused to flow between each of the envelopes 51. Most of the feed 72 flows through the module 12 and out the other end as indicated by arrows 78. Referring to FIG. 1, such flow would ultimately be channeled out of the unit 10 through pipe 26. However, some of the feed in would, by reverse osmosis, be caused to flow across the membrane areas 58 into the interior of each envelope 51. The fluid component which does this, however, would contain no salt or other similar undesirable component, as such component or components are prevented by membrane areas 58. The flow which does penetrate an envelope 51 is indicated by arrow 74. Once this occurs, the selected fluid would now be within each envelope 51 and would be channeled toward the flow guide member 46 by the permeate collector sheets 54. As the water flows along sheets 54 as indicated by arrows 76, it would eventually flow to the spirally formed flow guide member 46. As the selected fluid flows along the member 46, it would eventually reach the openings 42 in the mandrel 40 and thus flow along the axial passageway 44 and out of the mandrel 12 and indicated by arrow 80 in FIG. 6. From this point it would be directed out of the unit 10 through outlet pipe 32.

In terms of preferred materials, since relatively high pressures are contemplated for use in the apparatus of the present invention, it is desirable to obtain bonds which have sufficient strength to withstand such pressures. When cellulose acetate is utilized for the support sheets 56, a suitable adhesive for bonding together the edges of the sheets 54 and 56 has been found to be a modified epoxy resin. Such adhesive material is generally compatable with the materials used and adequately wets them forming a strong bond after curing is completed. Of course other adhesive materials are also within the scope of the present invention. The vessel 12 is preferably fabricated from a corrosion-resistant material such as copper, coated mild steel, stainless steel, fiberglass reinforced epoxy, other plastics and the like. The internal diameter of the enclosure is approximately equal to the outer diameter of the module 12 such that a sufficiently tight fit is provided between the module 12 and the enclosure 14. However, in order to insure adequate sealing, it may be advantageous to wrap the module 12 with plastic tape or to use various seals along the length of the module 12. Also in terms of operation, sea water is preferably maintained at a predetermined pressure throughout its residence time in the purification unit 10. This pressure is generally in excess of that sufficient to cause reverse osmosis to occur, i.e., to cause diffusion of pure water from the sea water through the semipermeable membrane areas 58 into the sheets 54. This is advantageously achieved by employing a pump for supplying sea water to the purification unit 10 and by providing an appropriate pressure control valve in the waste outlet pipe 26 so as to adjust the pressure of the sea water present in the purification compartment 30. The pump is preferably adjusted to provide a relatively constant flow of sea water through the purification compartment 30. Such a provision is desirable for promoting the maintenance of an equalibrium salt concentration.

It should be understood that while the preferred examples described herein deal with specific shapes, other configurations can be used. It will thus be apparent to one skilled in the art that other changes and modifications can be made without departing from the spirit or scope of the present invention as defined and claimed herein. Such modifications and changes are deemed to be within the scope of the appended claims.

What is claimed is:

1. A spirally wrapped reverse osmosis module membrane for separating a selected fluid component from a feed stock, comprising:

a mandrel having an axial passageway forming a flow path for said selected fluid component through said mandrel;

a flow guide member for forming a channel for said selected fluid component to said mandrel, said flow guide member spirally wrapped around said mandrel and in fluid communication with said axial passageway;

a plurality of generally rectangular membrane envelopes formed from (i) elongated permeate collector sheets, each said collector sheet forming a flow path for said selected fluid component from the outer periphery of each said envelope to said flow guide member, and (ii) folded support sheets placed between and joined to adjacent collector sheets, each said support sheet having membrane areas where reverse osmosis with said feed stock takes place, each said support sheet further being folded in an area where reverse osmosis does not take place, thereby eliminating folded lines on said membrane areas where reverse osmosis of said feed stock does take place;

said flow guide member and said envelopes being spirally wrapped around said mandrel such that the distance from the folded edge of each support sheet to the mandrel radially increases along a generally spiral path; and a flow spacer disposed between each adjacent envelope such that one end of said flow spacer is located adjacent the area where said support sheet is folded and where reverse osmosis does not take place, said flow spacer for separating each envelope thereby forming a passageway for the feed stock to flow across the membrane areas on each said envelope.

2. A membrane according to claim 1 wherein said mandrel has a plurality of openings in flow communication with said axial passageway and said flow guide member.

3. A membrane according to claim 1 wherein said flow guide member comprises a plurality of sheets of permeate carrier material forming a spiral flow path to said mandrel for said selected fluid component.

4. A membrane according to claim 1 wherein the area on each said support sheet which contains said fold, is formed from a layer of non-permeable coating.

5. A membrane according to claim 4 wherein the areas on each said sheet of backing material when reverse osmosis occurs is formed from a layer of semipermeable polymeric coating.

6. A membrane according to claim 1 wherein said flow spacer is a screen.

7. A membrane according to claim 1 wherein sheets of support material are joined along three side edges thereof to associated edges on each side of an associated collector sheet.

* * * * *